United States Patent
Stellbrink (10) Patent No.: US 8,036,456 B2
(45) Date of Patent: Oct. 11, 2011

(54) MASKING A VISUAL DEFECT

(75) Inventor: Joseph W. Stellbrink, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 972 days.

(21) Appl. No.: 11/879,652

(22) Filed: Jul. 18, 2007

(65) Prior Publication Data
US 2008/0063256 A1 Mar. 13, 2008

Related U.S. Application Data (60) Provisional application No. 60/825,449, filed on Sep. 13, 2006.

(51) Int. Cl.
G06K 9/00 (2006.01)
G06K 9/40 (2006.01)
G06K 9/36 (2006.01)
G06F 15/00 (2006.01)

(52) U.S. Cl. ......... 382/167; 382/254; 382/280; 708/404

(58) Field of Classification Search .................. 382/167, 382/254, 280
See application file for complete search history.

(56) References Cited

U.S. PATENT DOCUMENTS

| | | | | |
|---|---|---|---|---|
| 6,618,115 B1 * | 9/2003 | Hiroki | ............................. | 349/192 |
| 7,460,133 B2 * | 12/2008 | Messing et al. | ................ | 345/613 |
| 7,639,849 B2 * | 12/2009 | Kimpe et al. | .................. | 382/128 |
| 7,714,881 B2 * | 5/2010 | Kimpe | ............................ | 345/690 |
| 2005/0179675 A1 * | 8/2005 | Hekstra et al. | ................. | 345/204 |
| 2006/0044425 A1 | 3/2006 | Yeung et al. | | |

FOREIGN PATENT DOCUMENTS

| EP | 692728 A | 1/1996 |
|---|---|---|
| EP | 605403 A | 12/2005 |

OTHER PUBLICATIONS

Messing et al., "Using Optimal Rendering to Visually Mask Defective Subpixels", Proceedings of SPIE-IS&T vol. 6057 605700-1-605700-12, Feb. 9, 2006.*

* cited by examiner

*Primary Examiner* — Brian Q Le
*Assistant Examiner* — Jose M Torres (57) ABSTRACT

An image rendering method for masking a visual defect is disclosed. In an embodiment, the method includes determining a location of the visual defect, identifying a plurality of sub-pixels neighboring the visual defect and utilizing contrast sensitivity functions and visual masking characteristics of a human visual system to optimize adjustments to the plurality of neighboring sub-pixels to mask the visual defect.

17 Claims, 6 Drawing Sheets

MASKING A VISUAL DEFECT

CROSS-REFERENCES TO RELATED APPLICATIONS

This application is entitled to the benefit of Provisional Patent Application Ser. No. 60/825,449, filed Sep. 13, 2006.

BACKGROUND

Large displays are becoming more prevalent throughout society, from high-definition television to digital advertising applications. As the number of pixels in a display increases, the probability of producing a completely defect-free display typically drops. For most display applications, the current approach is to classify completed displays into quality categories based on the number of pixel and sub-pixel defects.

A consumer's discovery that a newly purchased display has 'defects' often leads to significant dissatisfaction. In advertising or public information applications, display defects may actually produce a negative impression in viewers of the display. In some critical industrial applications (e.g. medical imaging) defect-free displays are required to ensure accuracy of the information displayed or in other cases display defect locations can be visually flagged for display users. Consequently, this is a particularly challenging problem for display manufacturers.

DETAILED DESCRIPTION

Figure 1:
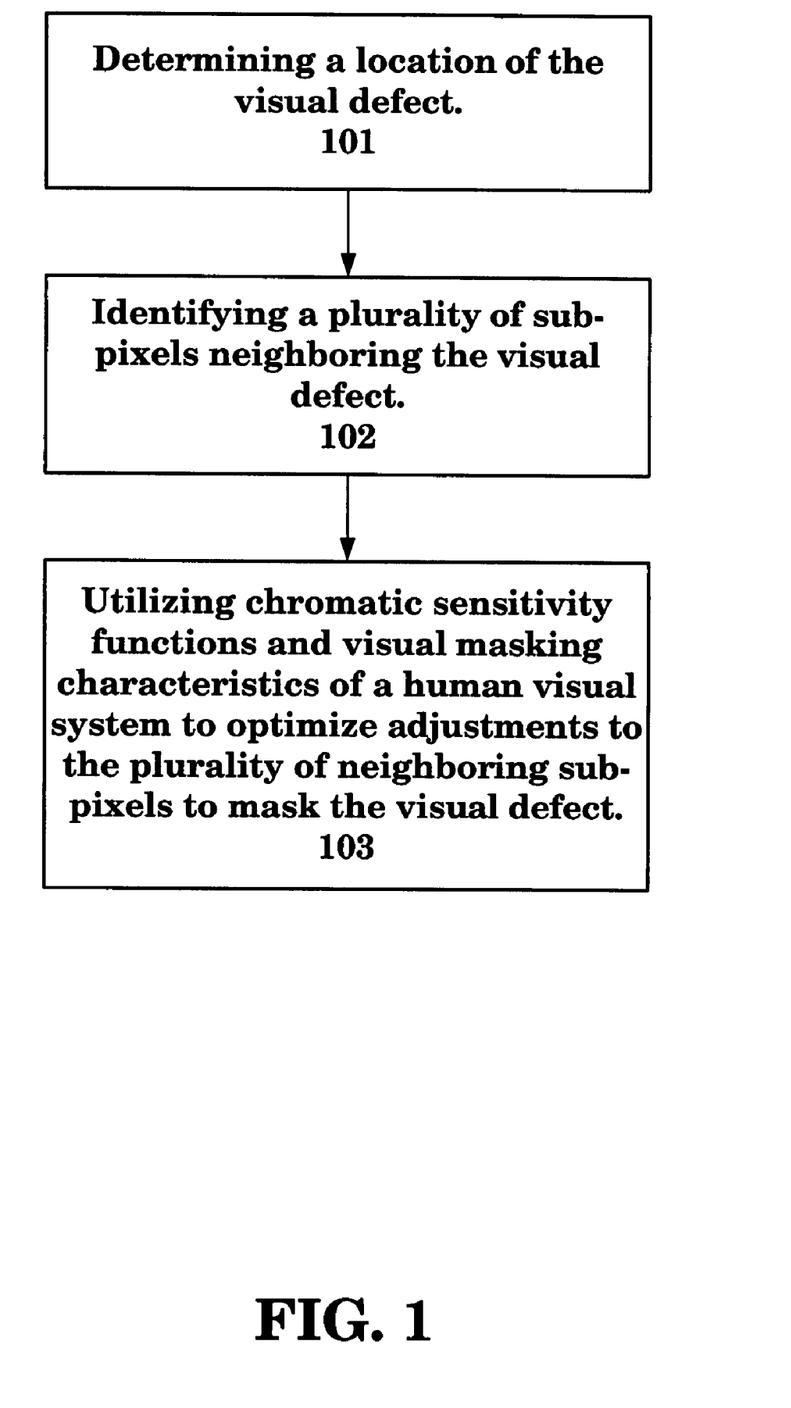
FIG. 1 is a high-level flowchart of a method in accordance with an embodiment.

FIG. 1 is a flowchart of a method in accordance with an embodiment. A first step 101 involves determining a location of the visual defect. A second step 102 includes identifying a plurality of sub-pixels neighboring the visual defect. A final step 103 includes utilizing contrast sensitivity functions and visual masking characteristics of a human visual system to optimize adjustments to the plurality of neighboring sub-pixels to mask the visual defect.

Figure 6:
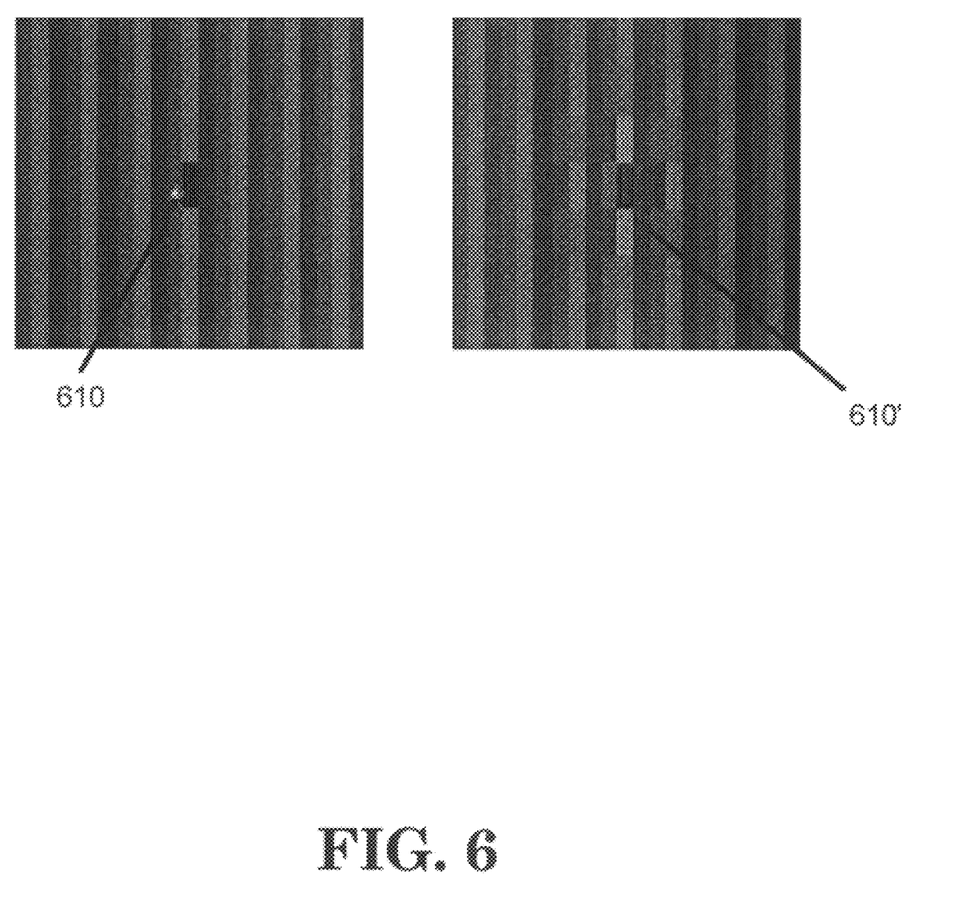
FIG. 6 shows magnified images of an uncompensated sub-pixel defect and the resulting visually-compensated defect.

The concept of visually hiding defective pixels through adjustment of neighboring pixels and sub-pixels has been explored and the possibility of using a masking algorithm for hiding defective pixels and sub-pixels is quite attractive from both a manufacturing yield and customer satisfaction perspective. Such algorithms are particularly attractive for new display technologies which often have substantial sub-pixel defect occurrence rates due to the immaturity of the technology. A visual defect is any physical location on the display which has a significant (noticeable) error in terms of luminance and/or chrominance between the actual and desired output. This could be pixels or sub-pixels stuck in a bright or dark state, display seams, debris, scratches, incorrect colors, etc. A specific example is the case where a sub-pixel is stuck in either a bright or dark state (See FIG. 6 infra), which is not uncommon due to an electrical defect.

Recent methods adopted to address this problem include the Point Spread Function (PSF) method and the Contrast Sensitivity Function (CSF) method. For an example of the PSF method, please refer to the article entitled "Human vision-based algorithm to hide defective pixels in LCDs" by T. Kimpe, S. Coulier and G. Van Hoey, Proc. OF SPIE-IS&T, 6057 (2006). The PSF method employs a PSF model of the human visual system in adjusting neighboring pixels to compensate for the luminance error produced by a pixel defect. The measured PSF from a human subject is often asymmetric and irregularly shaped, thus difficult to describe mathematically.

The PSF algorithm is applied to grayscale patches in a monochrome display application. When the method is applied to color patches and images, where sub-pixels are allowed to change independently, the lack of constraints on chromatic information is instantly obvious in the form of large chromatic errors. To prevent these chromatic errors, while still considering only luminance information, the algorithm may allow only those sub-pixels within the defect's color plane (red, green or blue) to be adjusted. This constraint prevents large chromatic artifacts, though it also prevents immediately neighboring sub-pixels of other colors from being used to compensate for the defect's luminance error.

The basic concept of the CSF method is to minimize the perceptible error between each display sub-pixel and the corresponding target image location, using the characteristics of the human visual system (HVS), as estimated by the CSF's. For an example of the CSF method, please refer to the article entitled "Using Optimal Rendering to Visually Mask Defective Subpixels" by D. Messing and L. Kerofsky, Proc. OF SPIE-IS&T, 6057 (2006). With the introduction of additional constraints, a sub-pixel rendering method can be used to minimize luminance and chrominance errors created by sub-pixel defects, thus helping to hide the defects. The theoretical advantage of the CSF method is that it considers both luminance and chromatic sensitivities.

However, neither the PSF or CSF method considers visual masking characteristics of the human visual system. Visual masking occurs when a visible stimulus is hidden by the addition of another stimulus. By considering the effects of visual masking, the sub-pixels surrounding the defect can be adjusted to further reduce the visibility of the defect versus only considering the human contrast sensitivity functions or point spread functions.

Figure 2:
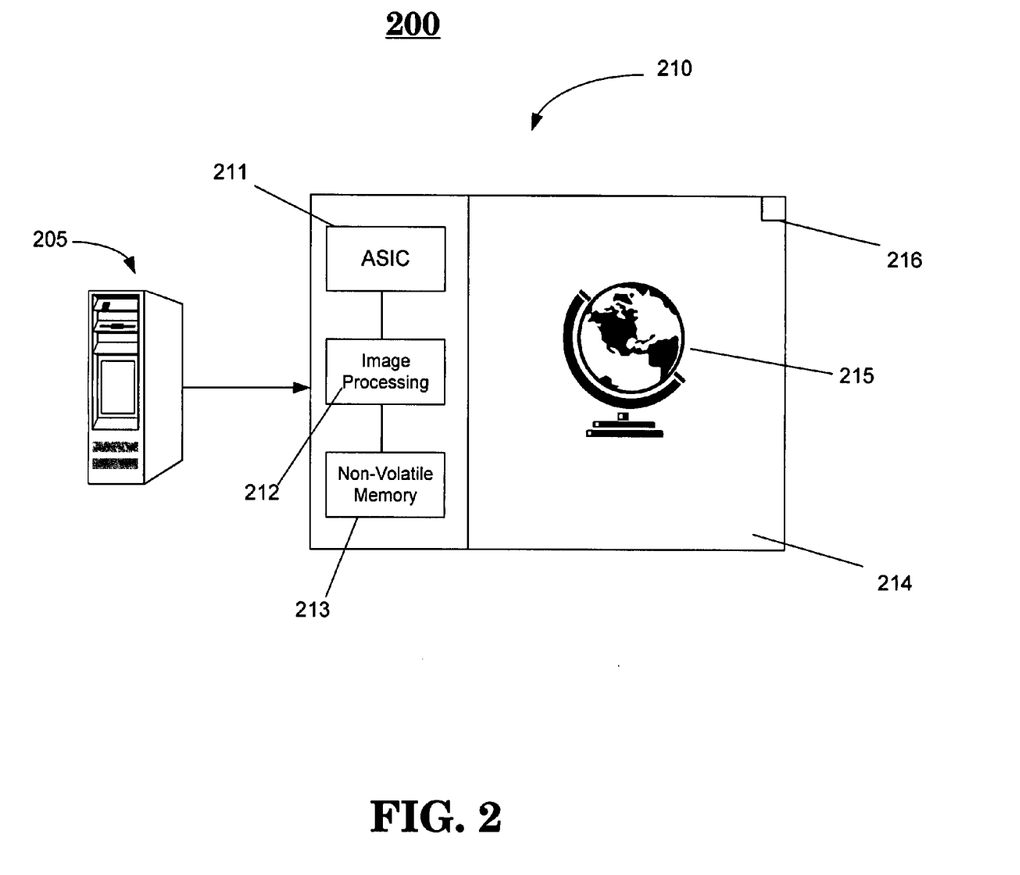
FIG. 2 is an illustration of a system for implementing the proposed image rendering algorithm in accordance with an embodiment.

FIG. 2 is an illustration of a system 200 for implementing the proposed image rendering algorithm. The system 200 includes an image generating device 205 and a display mechanism 210. The display mechanism 210 includes an Application Specific Integrated Chip (ASIC) 211, an image processing component 212, a non-volatile memory 213 and a display screen 214 for displaying an image 215.

Figure 3:
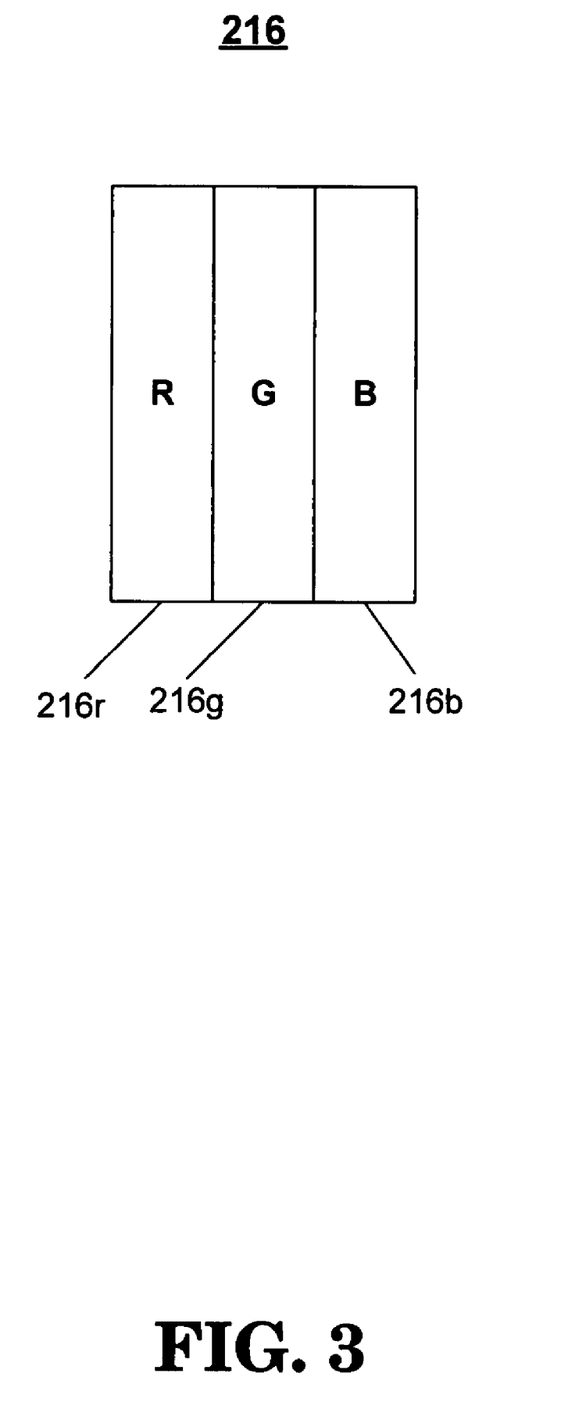
FIG. 3 shows a more detailed illustration of a pixel in accordance with an embodiment.

The image rendering device 205 could be a personal computer, a camera, or any of a variety devices capable of generating an image on the display screen 214. In an embodiment, the display screen 214 is a liquid crystal display (LCD) made up of a plurality of pixels 216. FIG. 3 shows a more detailed illustration of a pixel 216. In an embodiment, the pixel 216 is made up of Red, Green and Blue sub-pixels 216r, 216g, 216b respectively. Basically the sub-pixels 216r, 216g, 216b make up a full "macro" pixel 216 which can display any display color. The sub-pixels themselves can only display one of the primary colors of the display. It should be noted that RGB stripes are just one embodiment for a display and different colors, number of colors and/or geometries could make up the "macro" pixel.

Figure 4:
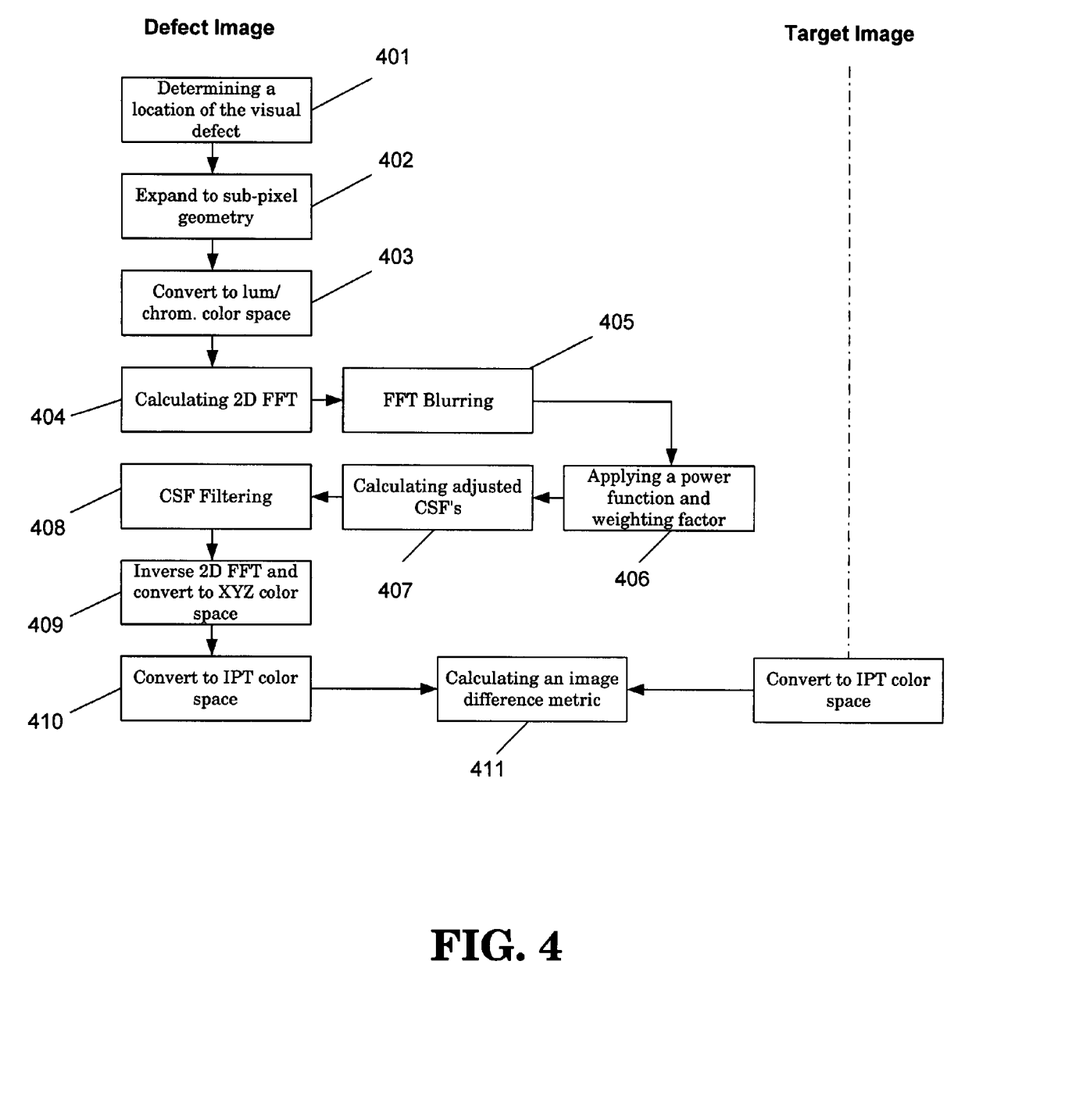
FIG. 4 is a more detailed flowchart of the method in accordance with an embodiment.

In an embodiment, a masking algorithm is employed by the system 200 to mask a visual defect in the display screen. In an embodiment, the algorithm can be implemented via the ASIC 211 component. FIG. 4 is a more detailed flowchart outlining the masking algorithm in accordance with an embodiment. It should be noted that a target image (an image that assumes no defects) and defect image flow through the algorithm in parallel. The location and type of defect being masked is utilized as an initial input. Accordingly a first step 401 involves determining a location of the visual defect. This could be done in a variety of ways. Taking the example of a stuck dark sub-pixel, at the end of the manufacturing process the defect would be detected via human or machine vision inspection, and the location and type of defect (i.e. dark) would be stored in the display's non-volatile memory for use by the algorithm. Another option involves defects which occur during the usage of the display (less common). Here, a technician or user could add the defect locations into the non-volatile memory via a display interface or PC software.

The only area processed during the visual masking sequence is the local area surrounding the defect. Consequently, only the local spatial features are considered, enabling a faster and more accurate rendering algorithm. In an embodiment, an area of approximately one visual degree is considered, wherein the area is centered at the defect location. The visual angle is the angle that a visual stimulus subtends at the eye, thus the actual area processed may change with viewing distance. Accordingly, a second step 402 involves spatially expanding the image area to represent the pixel and sub-pixel geometry of the LCD. For example, an RGB pixel can be physically expanded into a geometrical representation of an RGB stripe pixel. In an embodiment, each RGB image pixel is mapped to a geometrical representation of the display's sub-pixel geometry. This enables a more accurate representation of the display output, thereby allowing sub-pixels within an RGB pixel to more effectively compensate for the visual defect.

A next step 403 involves converting the RGB information to a luminance/chrominance color space. In an embodiment the YCC color space is employed. This enables the luminance and chrominance CSF filters to be applied accurately. Step 404 includes calculating a 2D Fast Fourier Transform (FFT) for the image area. A next step 405 includes smoothing the FFT. In an embodiment, the FFT of the image is smoothed using a two-dimensional Gaussian convolution kernel. This can be considered multiplying the original image by a Gaussian envelope in the spatial domain. The extent of the Gaussian kernel should be a function of both the viewing distance and image size. The effect of this smoothing is to simulate the influence of discrete spatial frequency and orientation channels of the HVS without actually implementing a complex multi-channel model.

The smoothing filter is applied in an attempt to simulate the manner in which the human visual system (HVS) is sensitive to sub-bands or "channels" of spatial frequencies and orientations, not to individual discrete spatial frequencies and orientation combinations. Step 406 includes applying a power function and a weighting factor. The power function provides an approximation of the masking characteristics of the HVS, though more complex functions could be used. The effect is to decrease the visibility of the defect of interest as the contrast of the masking pattern around it increases. The defect is well masked by the resulting image adjustments, but the image adjustments themselves may produce an undesirable artifact. The weighting factor provides a balance between masking of the defect and visibility of the image adjustments made in generating the defect mask, and may be used to optimize the performance of the algorithm for various scenarios.

Figure 5:
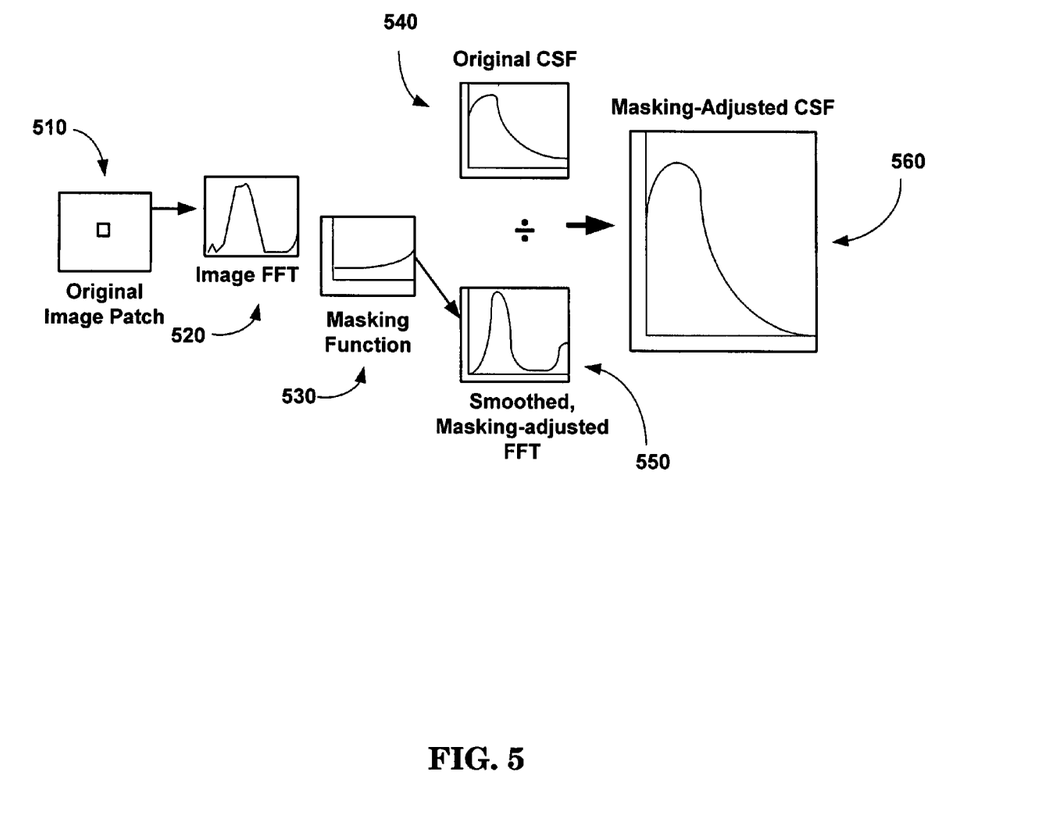
FIG. 5 shows a sequence of calculation steps in accordance with an embodiment.

Step 407 includes calculating adjusted CSF values. Here, the original 2-D CSF function is divided by the smoothed 2-D FFT of the image which has had the masking power function and weighting function applied. This sequence is illustrated in FIG. 5. FIG. 5 shows the mask-adjusted CSF 560, after the original 2-D CSF function 540 is divided by the smoothed 2-D FFT 550 of the image 510 which has had the weighting function 520 and masking power function 530 applied. The result is that spatial frequencies and orientations in the image are used to reduce the original contrast sensitivity estimate, thus incorporating masking characteristics of the HVS.

A next step 408 includes performing CSF filtering. In the spatial domain, this is a Gaussian-like convolution (i.e. averaging) process using the CSF functions (luminance and chrominance) instead of Gaussian curves. The result is more averaging for higher spatial frequencies and less for lower spatial frequencies, simulating the sensitivities of the HVS. In the FFT domain this convolution becomes a straight multiplication of the masking adjusted CSF's and the image FFT, thus reducing the power of higher frequencies, while leaving lower spatial frequencies relatively unchanged.

Step 409 includes performing an inverse 2D FFT on the image area and converting the image area to XYZ color space. Step 410 includes converting the image area to an IPT color space, or any other perceptually uniform color space. In an embodiment, the conversion to the XYZ color space and then to IPT could be combined into a single functional step. The intent is that image filtering must be done in luminance-chrominance space (YCC), but image differences should be done in a more perceptually uniform color space (like IPT), where each dimension has equally meaningful intervals. Therefore, the conversion to the XYZ color space is simply an interim step to get from YCC to IPT color space.

A next step 411 involves calculating an image difference metric. Once the conversion to a perceptually uniform color space has taken place, some type of distance metric to evaluate the error between the rendered image and a target image is calculated. For example, a linearly weighted Euclidean distance metric could be used. However, other distance metrics could be employed while remaining within the spirit and scope of the inventive concept.

As previously stated, the target image goes through the algorithm once in parallel with the defect image. However, the defect image goes through the process iteratively until the image difference metric between the rendered image and the target image reaches a predetermined threshold value. Ideally this would be reduced to zero error, but in practicality this would be some threshold value which would be considered "acceptable". This could be a root mean square value, a mean square error value, etc. Once this threshold is reached, the algorithm stops. Accordingly, the visual compensation that occurs as a result of the implementation of the image rendering algorithm minimizes the visibility of the defect at the specified viewing distance.

The above-delineated iterative rendering process can be computationally intensive and may be slow for some applications. Accordingly, in a different embodiment, the above concept could be approximated for a specific application using a series of shift-variant image processing filters. In this embodiment, a number of visual masks could be pre-calculated for various defect colors, types and magnitudes, and then based on the error characteristics for a given image, a visual mask is selected from a look-up-table and applied to the defect area. This approach would provide faster implementations while providing much of the benefit of the iterative process described above.

A method for masking a visual defect is disclosed. In an embodiment, the method includes determining a location of the visual defect, identifying a plurality of sub-pixels neighboring the visual defect and utilizing contrast sensitivity functions and visual masking characteristics of a human visual system to optimize adjustments to the plurality of neighboring sub-pixels to mask the visual defect. Accordingly through the use of the disclosed methodology, improved visual masking of defective sub-pixels in a pixilated display is accomplished.

The above-described embodiment may also be implemented, for example, by operating a computer system to execute a sequence of computer readable instructions. Accordingly, a computing device typically includes at least some form of computer readable media. Computer readable media can be any available media that can be accessed by a computing device. By way of example, and not limitation, computer readable media may include computer storage media and communications media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage device, or any other medium which can be used to store the desired information and which can be accessed by a computing device.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media. Accordingly, an alternate embodiment includes a computer readable medium having computer executable components for an image rendering method for masking a visual defect.

Without further analysis, the foregoing so fully reveals the gist of the present inventive concepts that others can, by applying current knowledge, readily adapt it for various applications without omitting features that, from the standpoint of prior art, fairly constitute the characteristics of the generic or specific aspects of the above-delineated embodiments. Therefore, such applications should and are intended to be comprehended within the meaning and range of equivalents of the following claims.

The invention claimed is:

1. A method of masking a visual defect comprising:
   a) determining a location of the visual defect;
   b) identifying a plurality of sub-pixels neighboring the visual defect; and
   c) utilizing contrast sensitivity functions and visual masking characteristics of a human visual system to optimize adjustments to the plurality of neighboring sub-pixels to mask the visual defect, wherein step c) further comprises:
      c1) filtering the location of the visual defect;
      c2) calculating an adjusted filtering value;
      c3) utilizing the adjusted filtering to convert the location to a predetermined color space; and
      c4) calculating an image difference metric based on the predetermined color space.

2. The method of claim 1 wherein step c1) further comprises:
   c1i) expanding the location of the visual defect based on the predetermined color space;
   c1ii) converting the location to a color space; and
   c1iii) calculating a 2D FFT for the location.

3. The method of claim 2 wherein calculating an adjusted filtering value further comprises:
   c2i) smoothing the 2D FFT; and
   c2ii) calculating an adjusted contrast sensitivity function (CSF).

4. The method of claim 3 wherein calculating an adjusted CSF further comprises:
   c2iii) applying a function to estimate the masking characteristics of the human visual system and a weighting factor to the smoothed 2D FFT.

5. The method of claim 1 wherein utilizing the adjusted filtering value to convert the location to a predetermined color space further comprises:
   c3i) converting the adjusted filtering value to a spatial domain and a color space.

6. The method of claim 1 wherein the image difference metric comprises the difference between a target image and a rendered image and the method further comprises:
   repeating steps c1)-c4) until the image difference metric is a predetermined value.

7. The method of claim 1 further comprising:
   utilizing steps a-c to generate a plurality of masks; and
   selecting one of the plurality of masks based on characteristics of the visual defect to mask the visual defect.

8. A computer program product for masking a visual defect, the computer program product comprising a non-transitory computer usable medium having a computer readable program that when executed by a computer implements the steps of:
   a) determining a location of the visual defect;
   b) identifying a plurality of sub-pixels neighboring the visual defect; and
   c) utilizing contrast sensitivity functions and visual masking characteristics of a human visual system to optimize adjustments to the plurality of neighboring sub-pixels to mask the visual defect, wherein step c) further comprises:
      c1) filtering the location of the visual defect;
      c2) calculating an adjusted filtering value;
      c3) utilizing the adjusted filtering value to convert the location to a predetermined color space; and
      c4) calculating an image difference metric based on the predetermined color space.

9. The computer program product of claim 8 wherein step c1) further comprises:
   c1i) expanding the location of the visual defect based on the predetermined color space;
   c1ii) converting the location to a color space; and
   c1iii) calculating a 2D FFT for the location.

10. The computer program product of claim 9 wherein calculating an adjusted filtering value further comprises:

c2i) smoothing the 2D FFT; and c2ii) calculating an adjusted contrast sensitivity function (CSF).

11. The computer program product of claim 10 wherein calculating an adjusted CSF further comprises:

c2iii) applying a function to estimate the masking characteristics of the human visual system and a weighting factor to the smoothed 2D FFT.

12. The computer program product of claim 8 wherein utilizing the adjusted filtering value to convert the location to a predetermined color space further comprises:

c3i) converting the adjusted filtering value to a spatial domain and a color space.

13. The computer program product of claim 8 wherein the image difference metric comprises the difference between a target image and a rendered image.

14. The computer program product of claim 8 further comprising:

utilizing steps a-c to generate a plurality of masks; and selecting one of the plurality of masks based on characteristics of the visual defect to mask the visual defect.

15. A system for masking visual defects comprising:

an image generating device;

a display mechanism coupled to the image generating device wherein the display mechanism comprises a processing component for implementing a method of masking a visual defect comprising:

a) determining a location of the visual defect;

b) identifying a plurality of sub-pixels neighboring the visual defect; and c) utilizing contrast sensitivity functions and visual masking characteristics of a human visual system to optimize adjustments to the plurality of neighboring sub-pixels to mask the visual defect, wherein step c) further comprises:

c1) filtering the location of the visual defect;

c2) calculating an adjusted filtering value;

c3) utilizing the adjusted filtering value to convert the location to a predetermined color space; and c4) calculating an image difference metric based on the predetermined color space.

16. The system of claim 15 wherein the image difference metric comprises the difference between a target image and a rendered image.

17. The system of claim 15 further comprising:

utilizing steps a-c to generate a plurality of masks; and selecting one of the plurality of masks based on characteristics of the visual defect to mask the visual defect.

* * * * *